(12) United States Patent
Appel

(10) Patent No.: US 8,573,627 B2
(45) Date of Patent: Nov. 5, 2013

(54) FIFTH WHEEL SUPPORT ASSEMBLY

(75) Inventor: Michael D. Appel, Holland, MI (US)

(73) Assignee: SAF-Holland, Inc., Holland, MI (US)

( * ) Notice: Subject to any disclaimer, the term of this patent is extended or adjusted under 35 U.S.C. 154(b) by 91 days.

(21) Appl. No.: 13/287,601

(22) Filed: Nov. 2, 2011

(65) Prior Publication Data

US 2012/0280472 A1  Nov. 8, 2012

Related U.S. Application Data

(60) Provisional application No. 61/410,183, filed on Nov. 4, 2010.

(51) Int. Cl.
*B62D 53/06* (2006.01)
(52) U.S. Cl.
USPC .................. 280/441; 280/438.1; 280/439
(58) Field of Classification Search
USPC ............................ 280/441, 438.1, 439
See application file for complete search history.

(56) References Cited

U.S. PATENT DOCUMENTS

| | | | | |
|---|---|---|---|---|
| 3,722,914 | A * | 3/1973 | Walther | 280/407 |
| 3,893,710 | A * | 7/1975 | Madura | 280/407 |
| 4,856,804 | A * | 8/1989 | Nash | 280/430 |
| 5,449,191 | A * | 9/1995 | Cattau | 280/438.1 |
| 5,639,106 | A * | 6/1997 | Vitale et al. | 280/407 |
| 6,488,305 | B2 * | 12/2002 | Laarman | 280/438.1 |
| 6,592,140 | B1 * | 7/2003 | Alguera Gallego et al. | 280/441 |
| 7,699,334 | B1 * | 4/2010 | Mann et al. | 280/407.1 |
| 7,717,451 | B2 * | 5/2010 | Alguera | 280/438.1 |
| 7,862,067 | B2 * | 1/2011 | Alguera | 280/438.1 |
| 7,874,569 | B2 * | 1/2011 | Schmidt et al. | 280/438.1 |
| 7,938,429 | B2 * | 5/2011 | Mann et al. | 280/438.1 |
| 2002/0175495 | A1 * | 11/2002 | Laarman | 280/438.1 |
| 2003/0209879 | A1 * | 11/2003 | Lindenman et al. | 280/438.1 |
| 2004/0173992 | A1 * | 9/2004 | Stunder et al. | 280/438.1 |
| 2006/0202443 | A1 * | 9/2006 | Sibley et al. | 280/441 |
| 2007/0007747 | A1 * | 1/2007 | Laarman | 280/438.1 |
| 2009/0230655 | A1 * | 9/2009 | Schmidt et al. | 280/407 |
| 2012/0007336 | A1 * | 1/2012 | Sibley et al. | 280/438.1 |

* cited by examiner

*Primary Examiner* — Kevin Hurley
*Assistant Examiner* — Michael Stabley
(74) *Attorney, Agent, or Firm* — Price Heneveld LLP

(57) ABSTRACT

A fifth wheel hitch support assembly includes a support bracket adapted to pivotally support a fifth wheel hitch plate, a mounting member adapted to be coupled to a vehicle frame rail to create a gap therebetween and above the frame rail, wherein the gap extends longitudinally along the mounting member, and wherein the mounting member includes a plurality of irregularities spaced longitudinally along the length thereof, and an engagement assembly operably coupled to the support bracket wherein the engagement assembly is operable between an engaged position locking the support bracket with respect to the mounting member at a select position along the length of the mounting member, and a disengaged position wherein the engagement assembly does not engage the plurality of irregularities, thereby allowing the support bracket to be slidably repositioned with respect to the support bracket.

32 Claims, 8 Drawing Sheets

FIFTH WHEEL SUPPORT ASSEMBLY

CROSS-REFERENCE TO RELATED APPLICATION

This application claims priority under 35 U.S.C. §119(e) on U.S. Provisional Patent Application No. 61/410,183, entitled "FIFTH WHEEL SUPPORT ASSEMBLY," filed on Nov. 4, 2010, by Michael D. Appel, the entire disclosure of the application is incorporated herein by reference.

BACKGROUND OF THE INVENTION

The present invention relates to fifth wheel coupling support assemblies and in particular to a slider assembly for adjustably supporting a fifth wheel hitch assembly from a frame of an associated vehicle.

SUMMARY OF THE INVENTION

One aspect of the present invention is to provide a fifth wheel hitch support assembly that comprises at least one support bracket adapted to pivotally support a fifth wheel hitch plate, and at least one mounting member adapted to be coupled with a vehicle frame rail to create a gap therebetween and above the frame rail, wherein the gap extends longitudinally along the at least one mounting member, and wherein the at least one mounting member includes a plurality of irregularities spaced longitudinally along the length thereof. The fifth wheel hitch support assembly further comprises an engagement assembly operably coupled to the at least one support bracket, wherein a portion of the engagement assembly is slidable within the gap and is operable between an engaged position, wherein the engagement assembly engages at least one of the irregularities, thereby locking the at least one support bracket with respect to the at least one mounting member at a selected position along the length of the at least one mounting member, and a disengaged position, wherein the engagement assembly does not engage a plurality of irregularities, thereby allowing the at least one support bracket to be slidably repositioned with respect to the at least one mounting member.

Another aspect of the present invention is to provide a fifth wheel hitch support assembly that comprises at least one support bracket adapted to pivotally support a fifth wheel hitch plate, and at least one L-shaped mounting member that includes a horizontally extending leg portion and a vertically extending leg portion adapted to be coupled to a vehicle frame rail to create a gap between the horizontal leg portion and the frame rail above the frame rail, wherein the gap extends longitudinally along the at least one mounting member, and wherein the at least one mounting member includes a plurality of apertures extending through the vertical leg portion and spaced longitudinally along a length of the mounting member. The fifth wheel hitch support assembly further comprises at least one guide plate releasably attached to an outboard surface and slidably abutting an outboard surface of the least one mounting member, and an engagement assembly operably coupled to the at least one support bracket, and wherein a portion of the engagement assembly is slidable within the gap and is operable between an engaged position, wherein the engagement assembly includes at least one of the apertures, thereby locking the at least one support bracket with respect to the at least one mounting member at a select position along the length of the at least one mounting member, and a disengaged position, wherein the engagement assembly does not engage the plurality of apertures, thereby allowing the at least one support bracket to be slidably repositioned with respect to the at least one mounting member. The present inventive fifth wheel hitch support assembly provides an uncomplicated design that can be assembled and operated by even relatively unskilled personnel, is efficient in use, is adapted for use with vehicles having varying spacing between the associated frame rails, is capable of a long operating life, and is particularly well adapted for the proposed use.

These and other advantages of the invention will be further understood and appreciated by those skilled in the art by reference to the written specification, claims and appended drawings.

DETAILED DESCRIPTION OF PREFERRED EMBODIMENTS

Figure 1:
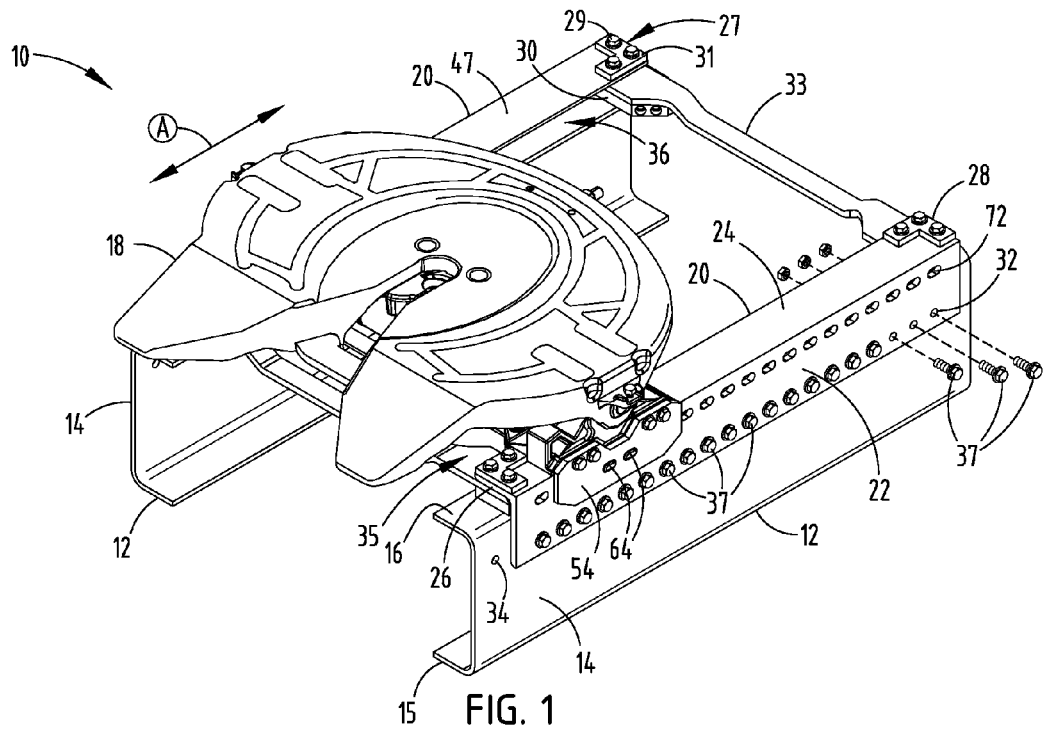
FIG. 1 is a perspective view of fifth wheel support assembly embodying the present invention, and supported on a pair of vehicle frame rails.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings, and described in the following specification are exemplary embodiments of the inventive concepts defined in the appended claims. Hence, specific dimensions and other physical characteristics relating to the embodiments disclosed herein are not to be considered as limiting, unless the claims expressly state otherwise.

The reference numeral 10 (FIG. 1) generally designates a fifth wheel support or slider assembly embodying the present invention. In the illustrated example, the fifth wheel slider assembly is supported by a pair of vehicle frame rails 12 each having a C-shaped cross sectional configuration that includes a vertical portion 14, a bottom horizontal portion 15 and a top horizontal portion 16. The slider assembly 10 supports a fifth wheel hitch plate 18 above the vehicle frame rails 12, such that the slider assembly 10 is slidably repositionable with regards to the frame rails in a direction A.

Figure 2:
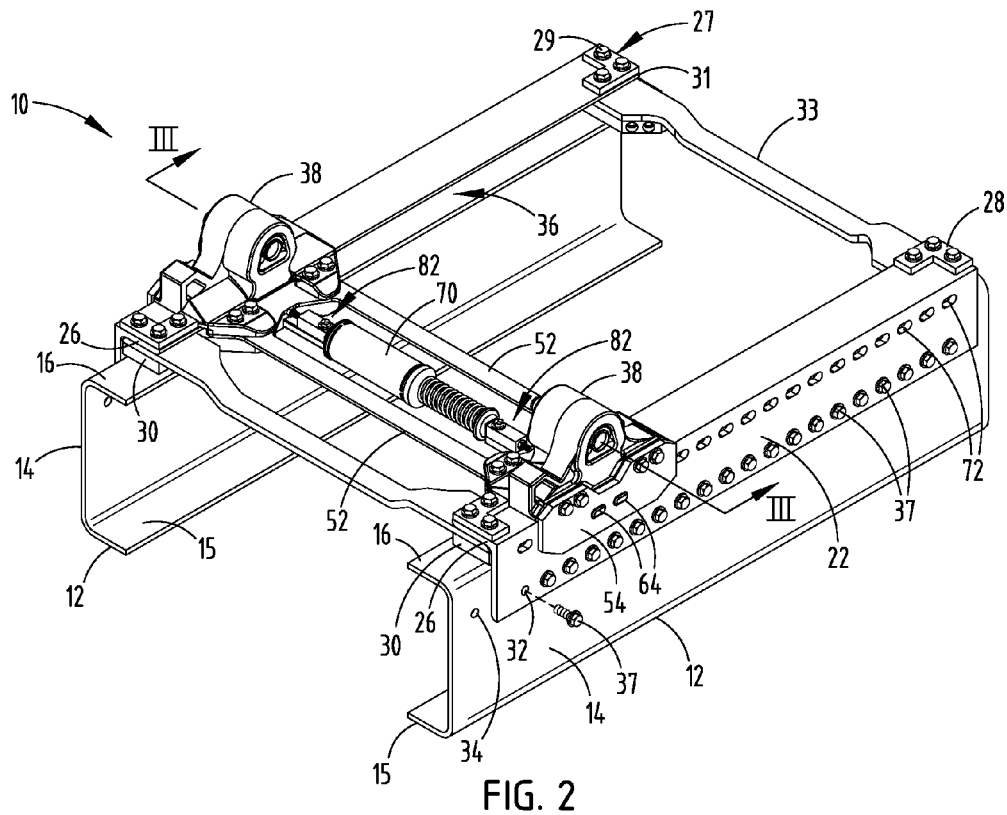
FIG. 2 is a perspective view of the fifth wheel support assembly with a fifth wheel hitch plate and control linkages removed.
Figure 3:
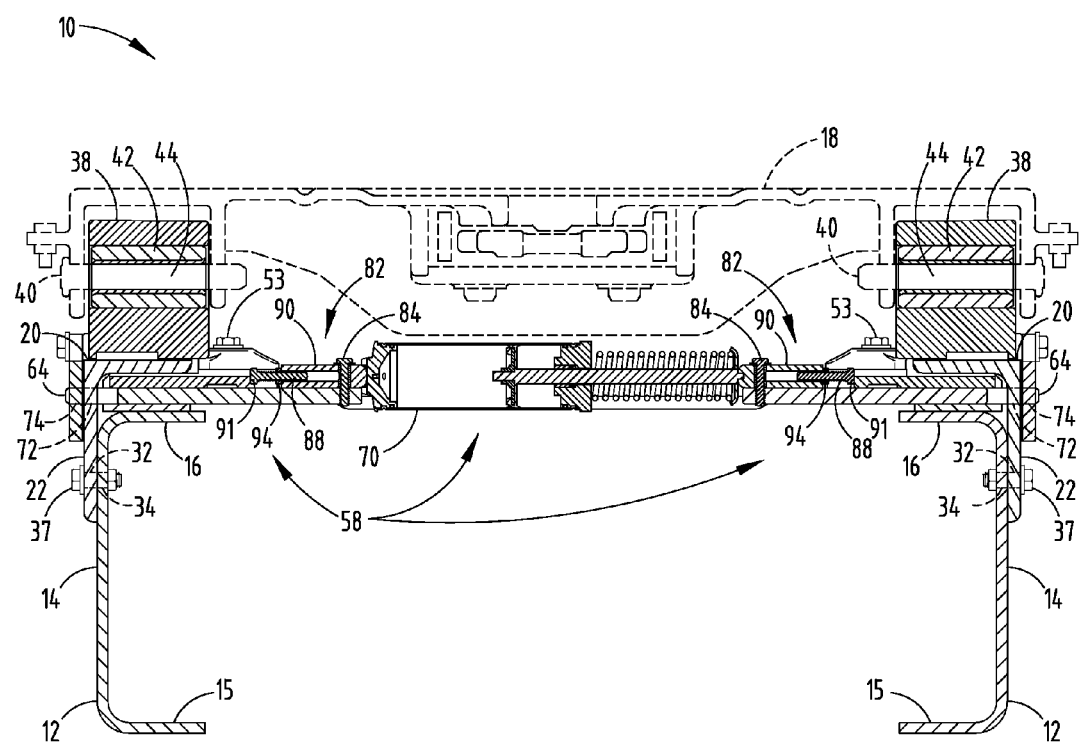
FIG. 3 is a cross-sectional end view of the fifth wheel support assembly taken along the line III-III, FIG. 2.

The slider assembly 10 includes a pair of L-shaped angle brackets 20 (FIGS. 2 and 3) each having a downwardly-extending vertical leg 22, an inwardly-extending horizontal leg 24, a first end 26 and a second end 28. A pair of stop assemblies 27 are fixedly secured to each angle bracket 20 proximate the ends 26, 28 thereof by corresponding fasteners 29. Each stop assembly includes a supporting block 30 vertically spacing one of the angle brackets 20 from the top horizontal portion 12 of the corresponding frame rail 14, and an L-shaped stop bracket 31 abutting the vertical leg 22 and the horizontal leg 24 of the corresponding angle bracket 20. A tie bar assembly 33 extends between the angle brackets 20 and are coupled thereto by the fasteners 29. A corresponding rearwardly-located tie bar assembly 35 may also be utilized. Further, the slider assembly 10 may be utilized without either the front or rear tie bar assemblies 31, 35 depending on certain configuration and load requirements. The vertical leg 22 of each angle bracket 20 includes a plurality of longitudinally spaced apertures 32 that are aligned with corresponding apertures 34 longitudinally spaced along the length of the vertical portion 14 of each of the vehicle frame rails 12. A plurality of mechanical fasteners such as bolts 37 extend through the apertures 32 of the angle brackets 20 and the apertures 34 of the vehicle frame rails 12 thereby operably connecting the angle brackets 20 with the respective vertical frame rails 12. Each of the angle brackets 20 is connected with a vertical frame rail 12 so as to define a gap 36 between the horizontal leg 24 of the angle bracket 20 and the top horizontal portion 16 of the vertical frame rail 12 as created by the supporting blocks 30.

Figure 4A:
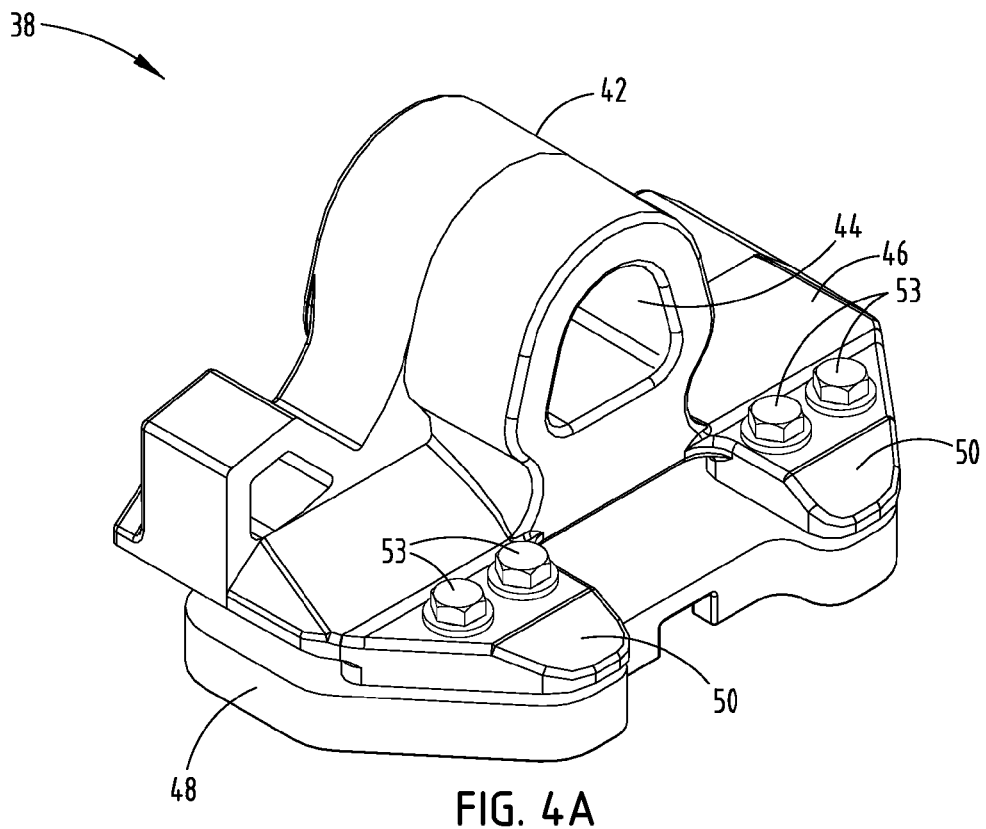
FIG. 4A is an enlarged top perspective view of a mounting bracket.
Figure 4B:
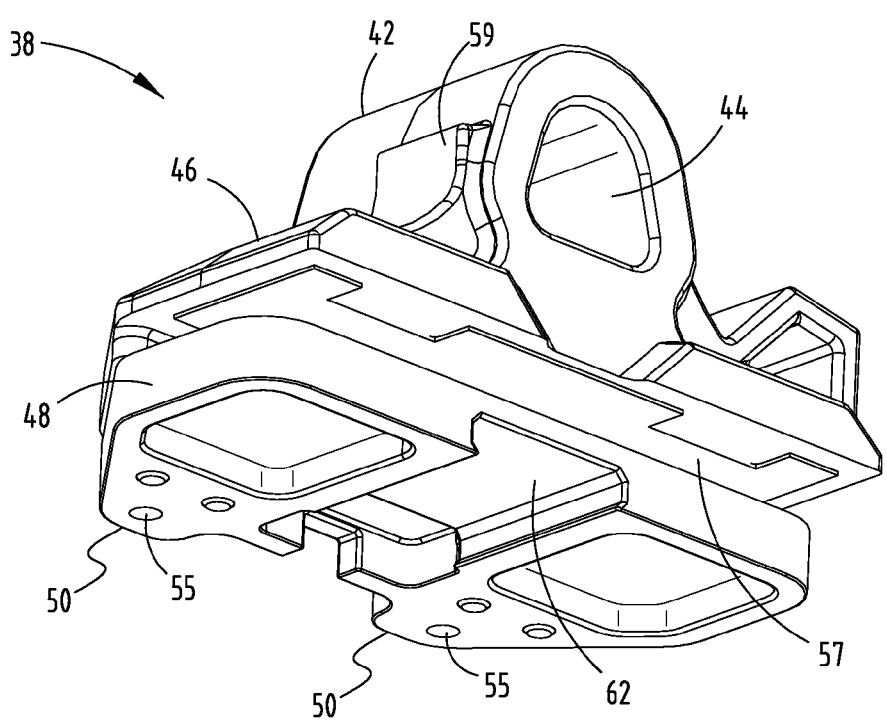
FIG. 4B is an enlarged bottom perspective view of the mounting bracket.
Figure 5:
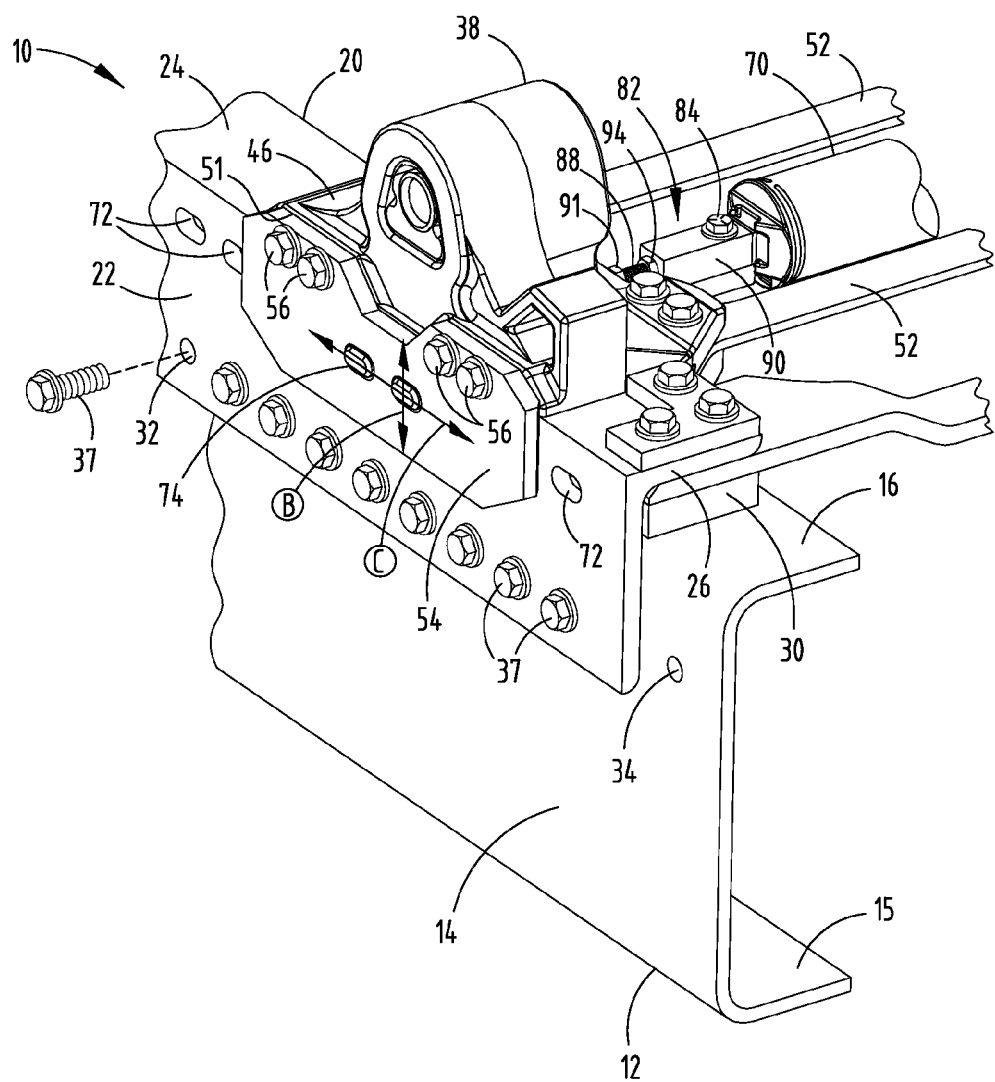
FIG. 5 is an enlarged perspective view of the fifth wheel support assembly.

The slider assembly 10 further includes a pair of support brackets 38 (FIGS. 4A and 4B) adapted to pivotally support the hitch plate 18 via a pair of pivot pins 40. Each support bracket 38 includes a bushing housing 42 having a bushing aperture 44 extending therethrough, a base plate portion 46 adapted to slide along an upper surface 47 of the horizontal leg 24 of the angle bracket 20, and a guide portion 48 adapted to slide within and along the length of the associated gap 36. Each support bracket 38 further includes a pair of inwardly extending support portions 50 coupled to a corresponding pair of cross members 52 extending between the support brackets 38 and coupled thereto by bolts 53 extending through apertures 55. As best illustrated in FIG. 5, a guide plate 54 is attached to a distal end 51 of the base plate portion 46 of each support bracket 38 via a pair of bolts 56. In assembly, the guide plate 54 abuts an outer or outboard surface of the vertical leg 22 of the respective angle bracket 20. As best illustrated in FIG. 4B, a wear pad 57 comprising a lubricious material, such as nylon, graphite, or ultra-high molecular weight polyethylene material is provided on an underside of the base plate portion 46 and abuts the upper surface of the horizontal leg 24, thereby protecting the aesthetic appearance of the same. Each support bracket 38 further includes an integrally-formed tilt stop 59 that abuts an underside of the fifth wheel plate 18, thereby limiting the amount of tilt available for the plate 18 with regards to the overall slide assembly 10.

Figure 6:
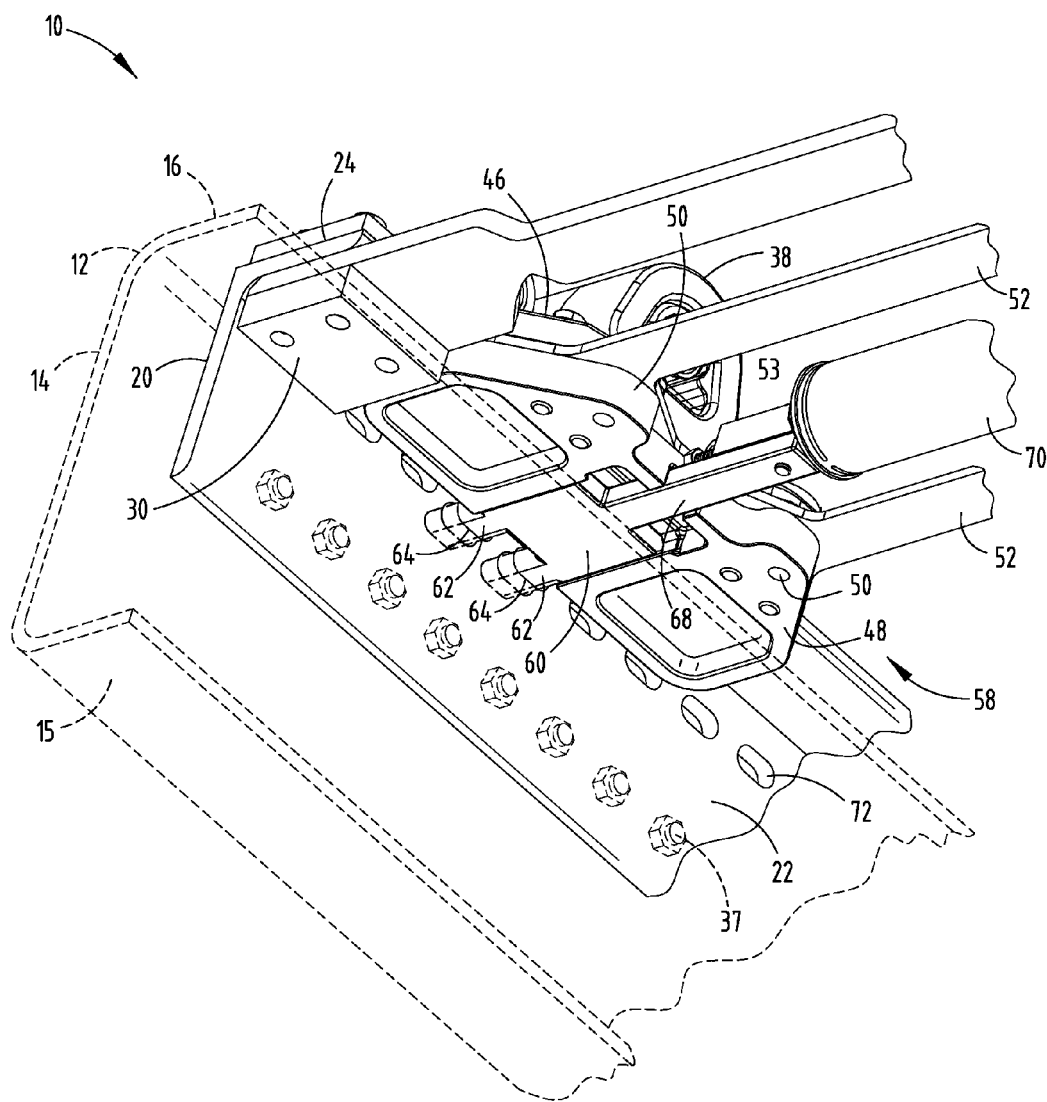
FIG. 6 is a perspective bottom view of the fifth wheel support assembly with a vehicle frame rail removed.

The slider assembly 10 further includes an engagement assembly 58 (FIGS. 6 and 7) that includes a pair of engagement members 60 slidably received within downwardly opening channels 62 located within an underside of the guide portion 48 and the support portion 50 of each of the support brackets 38. Each engagement member 60 includes a pair of outwardly extending engagement pins 64 and an inwardly extending attachment portion 68. Each attachment portion 68 is attached to an actuator such as a pneumatic cylinder 70 such that the engagement members 60 can be moved between an extended position, wherein the engagement pins 64 engage one pair of a plurality of longitudinally spaced apertures 72 spaced along the length of the vertical leg 22 of each angle bracket 20, and a pair of apertures 74 extending through each of the guide plates 54, thereby locking the slider assembly 10 at a selected position along the length of the frame rails 12, and a retracted position, wherein the engagement pins 64 are withdrawn from the apertures 72 of the angle brackets 20 and the apertures 74 of the guide plates 54, thereby allowing the slider assembly 10 to be repositioned along the length of the angle brackets 20. In this arrangement, the pins 64 maintain double shear loading of the support brackets 38 and guide plates 54 with regards to the angle brackets 20 in the horizontal direction B, the vertical direction C, and combinations thereof.

Figure 8:
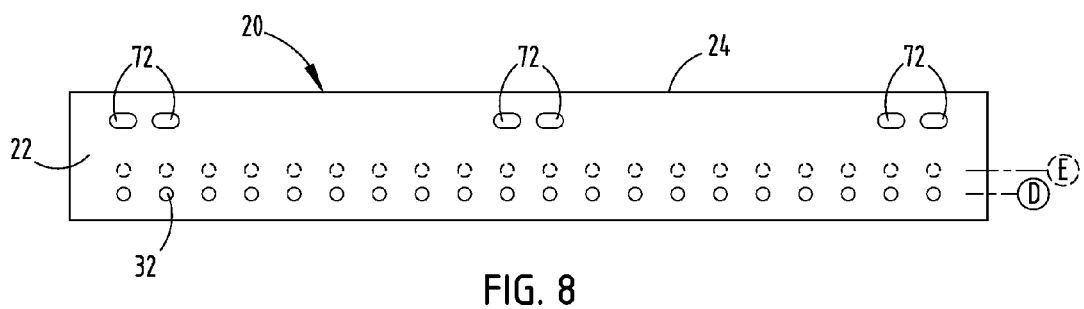
FIG. 8 is a side elevational view of an angle bracket of the support assembly.

As best illustrated in FIG. 8, the configuration of the angle bracket 20, and specifically the interlocking relationship of the engagement assembly 58 with regards to the angle bracket 20, allows for flexible positioning of the slider assembly 10 with regards to the associate frame rails 12. The exact positions of the apertures 72 along the length of the angle bracket 20 may be determined so as to limit the locations at which the slider assembly 10 may be positioned with regards to the vehicle, thereby resulting in a more streamline, less complicated assembly, a reduction in manufacturing costs due to the reduction of apertures 72 formed in the angle bracket 20, and increased safety by preventing operators from locking the slider assembly 10 in unsafe operating locations. As illustrated in FIG. 8, and by way of example, three distinct operating positions have been provided. Similarly, the overall height of the slider assembly 10 with regards to the frame rails 12 may be adjusted by adjusting the relative vertical locations of the apertures 32 within the vertical leg 22 of the angle bracket 20, thereby allowing for ride-height adjustment, e.g. first height D and second height E, wherein Ride-height is defined as the distance between the upper surface of the vehicle frame rails 12 and the upper surface of the fifth wheel hitch plate 18. Preferably, the apertures 32 are located within the vertical leg 22 so as to provide a Ride-height of within the range of between 6 inches and 12 inches, and more preferable of within the range of between 7 inches and 10 inches.

Figure 9:
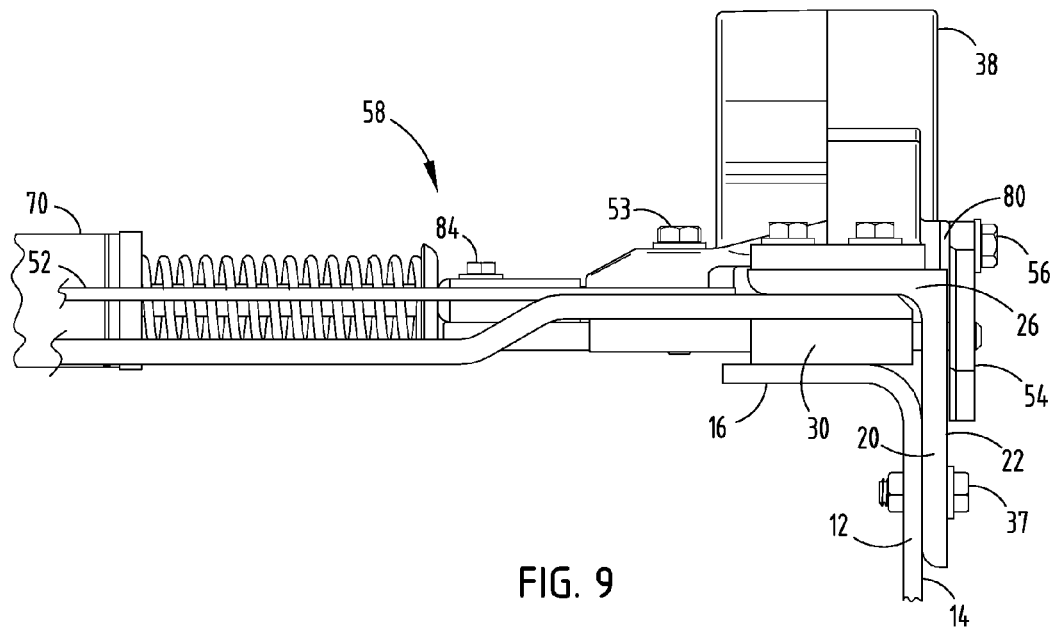
FIG. 9 is an enlarged, partial elevational end view of the support assembly.
Figure 10:
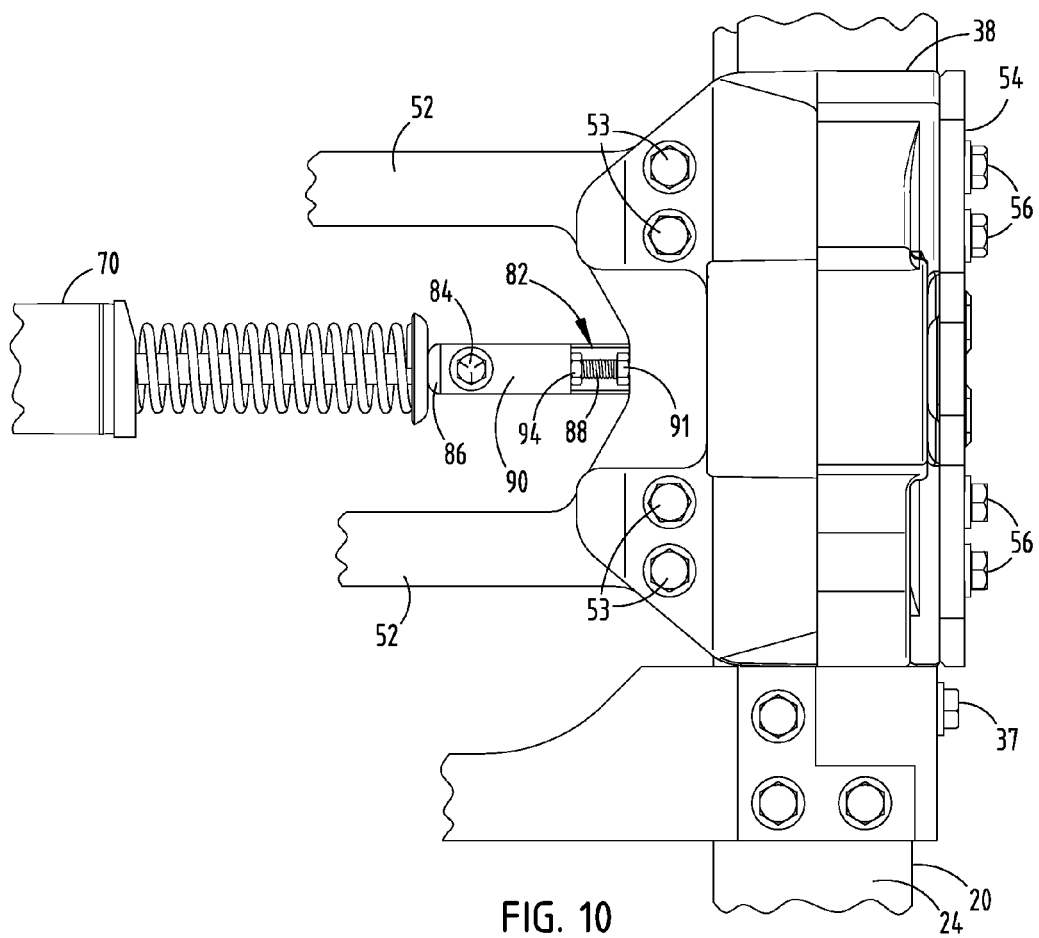
FIG. 10 is an enlarged, partial top plan view of the support assembly.
Figure 11:
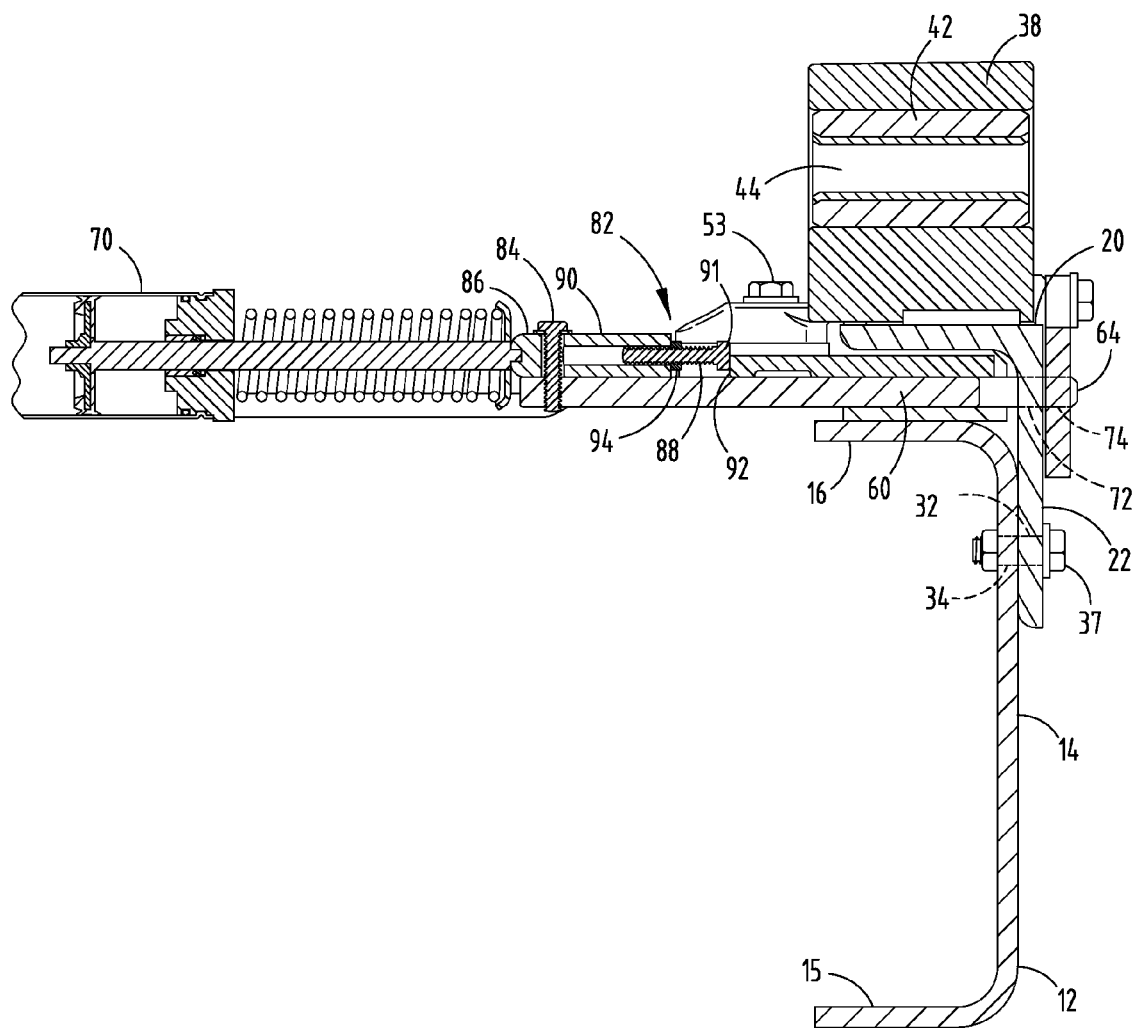
FIG. 11 is an enlarged, partial elevational end view of the support assembly.

The slider assembly 10 (FIG. 9) may also include spacer members 80 positioned between the distal end 51 of the support bracket 38 and the guide plate 54, thereby accommodating for vehicles having variously spaced frame rails 12 with commonly dimensioned support brackets 38, engagement assemblies 58, and the like. As best illustrated in FIGS. 10 and 11, a stroke depth adjustment assembly 82 includes a mounting block 90 coupled to an end of the pneumatic cylinder 70 by a bolt 84 at a first end 86 and threadably receives an adjustment bolt 88 within a second end 90. In operation, a head 91 of the adjustment bolt 88 abuts an inboard edge 92 of support bracket 38 as the engagement members 60 are moved from retracted position to the extended position, thereby limiting the stroke length of the pneumatic cylinder. A locking nut 94 allows the adjustment bolt 88 to be locked in a preselected position with regards to the mounting block 90, thereby allowing the effective length of the engagement assembly 58 to be adjusted for vehicles with variously spaced frame rails 12.

Figure 7:
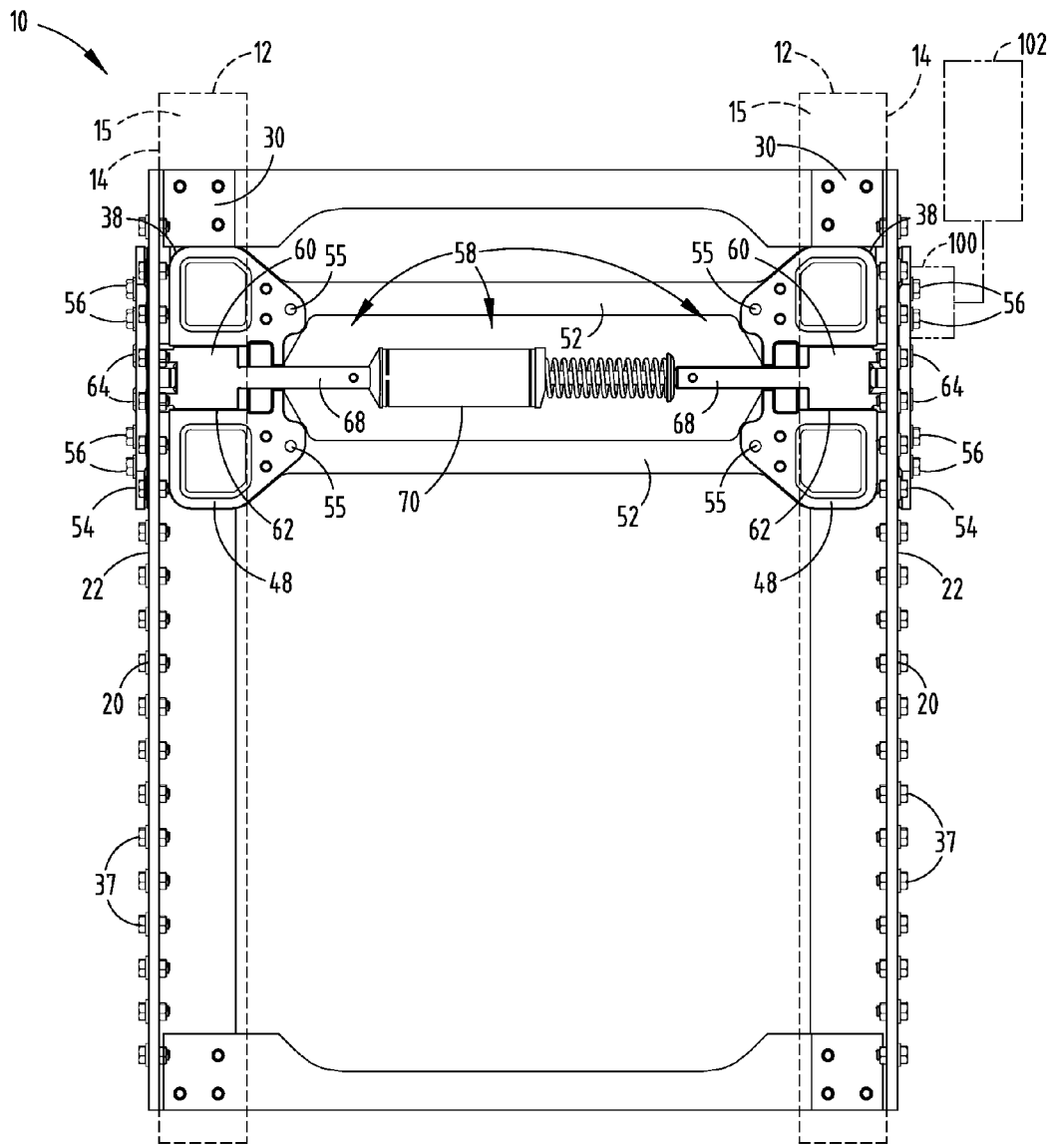
FIG. 7 is a bottom plan view of the fifth wheel support assembly.

As best illustrated in FIG. 7, the slider assembly 10 may also include a sensor assembly 100 adapted to sense proper positioning and locating of the engagement pins 64 within the apertures 72 of the angle bracket 20 and apertures 74 of the guide plates 54. The sensor assembly 100 sends a signal to a logic controller 102 which alerts the driver to proper alignment and/or misalignment situation.

The present inventive fifth wheel hitch assembly provides a direct support from which the fifth wheel brackets or mounting brackets traverse. This design further captures the engagement pins as described in both a vertical and horizontal double-shear arrangement, thereby increasing the load capacity of the load carrying components. Further, the present inventive slider assembly significantly reduces the amount of welding required as compared with slider assemblies known in the art, thereby reducing the likelihood of warpage or distortion of those components that would normally incur significant welding. The reduction and/or elimination of welding certain components also allows for pre-painted or fully protected services, thereby decreasing the likelihood of future oxidation and degradation.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The invention claimed is:

1. A fifth wheel hitch support assembly, comprising:
   at least one support bracket adapted to pivotably support a fifth wheel hitch plate;
   at least one mounting member adapted to be coupled to a vehicle frame rail to create a gap therebetween and above the frame rail, wherein the gap extends longitudinally along the at least one mounting member, and wherein the at least one mounting member includes a plurality of irregularities spaced longitudinally along a length thereof; and
   an engagement assembly operably coupled to the at least one support bracket, wherein a portion of the engagement assembly is slidable within the gap and is operable between an engaged position, wherein the engagement assembly engages at least one of the irregularities, thereby locking the at least one support bracket with respect to the at least one mounting member at a select position along the length of the at least one mounting member, and a disengaged position, wherein the engagement assembly does not engage the plurality of irregularities, thereby allowing the at least one support bracket to be slidably repositioned with respect to the at least one support bracket;
   wherein the plurality of irregularities includes a plurality of apertures; and wherein the at least one mounting member includes an L-shaped angle having a vertically extending leg portion and a horizontally extending leg portion, and wherein the plurality of apertures extend through the vertical leg portion of the L-shaped angle.

2. The fifth wheel hitch support assembly of claim 1, further including:
   at least one guide plate attached to an outboard surface and slidably abutting an outboard surface of the at least one mounting member.

3. The fifth wheel hitch support assembly of claim 2, further comprising:
   at least one spacer member positioned between the outboard surface of the at least one support member and the at least one guide plate, thereby spacing the at least one support member from the at least one guide plate.

4. The fifth wheel hitch support assembly of claim 1, wherein the at least one guide plate is releasably attached to the outboard surface of the at least one mounting member.

5. The fifth wheel hitch support assembly of claim 1, further including:
   at least one spacer member abutting a downwardly exposed surface of the at least one mounting member and adapted to space the at least one mounting member from the vehicle frame rail to form the gap.

6. The fifth wheel hitch support assembly of claim 1, wherein the at least one mounting member includes an integral stop portion adapted to abut the at least one support bracket, thereby limiting the sliding movement of the at least one support bracket with respect to the at least one mounting member.

7. The fifth wheel hitch support assembly of claim 1, further including:
   a sensor assembly adapted to sense the position and completeness of the engagement assembly with respect to the plurality of irregularities and provide a signal communicating the position and complete engagement; and
   a controller adapted to receive the signal from the sensor and provide information to an operator based on the position of the engagement assembly with respect to the plurality of irregularities.

8. The fifth wheel hitch support assembly of claim 1, wherein the engagement assembly includes stroke depth adjustment assembly that limits a distance from the disengaged position to the engaged position the engagement assembly may travel.

9. The fifth wheel hitch support assembly of claim 1, wherein the plurality of irregularities are not equally spaced along the length of the at least one mounting member.

10. The fifth wheel hitch support assembly of claim 1, wherein the irregularities are located with regards to the at least one mounting member to provide a Ride-height within the range of from about 6 inches to about 12 inches.

11. The fifth wheel hitch support assembly of claim 10, wherein the irregularities are located with regards to the at least one mounting member to provide a Ride-height within the range of from about 7 inches to about 10 inches.

12. A fifth wheel hitch support assembly, comprising:
   at least one support bracket adapted to pivotably support a fifth wheel hitch plate;
   at least one mounting member adapted to be coupled to a vehicle frame rail to create a gap therebetween and above the frame rail, wherein the gap extends longitudinally along the at least one mounting member, and wherein the at least one mounting member includes a plurality of irregularities spaced longitudinally along a length thereof; and
   an engagement assembly operably coupled to the at least one support bracket, wherein a portion of the engagement assembly is slidable within the gap and is operable between an engaged position, wherein the engagement assembly engages as least one of the irregularities, thereby locking the at least one support bracket with respect to the at least one mounting member at a select position along the length of the at least one mounting member, and a disengaged position, wherein the engagement assembly does not engage the plurality of irregularities, thereby allowing the at least one support bracket to be slidably repositioned with respect to the at least one support bracket;
   wherein the engagement assembly includes stroke depth adjustment assembly that limits a distance from the disengaged position to the engaged position the engagement assembly may travel, and wherein the stroke depth adjustment assembly includes an adjustment member that may be selectively positioned to selectively adjust the distant from the disengaged position to the engaged position the engagement assembly may travel.

13. The fifth wheel hitch support assembly of claim 12, wherein the at least one mounting member includes an L-shaped angle having a vertically extending leg portion and a horizontally extending leg portion.

14. The fifth wheel hitch support assembly of claim 13, wherein the vertical leg portion of the L-shaped angle is adapted to be secured to a vertically extending portion of a vehicle frame rail.

15. The fifth wheel hitch support assembly of claim 12, wherein the plurality of irregularities includes a plurality of apertures.

16. The fifth wheel hitch support assembly of claim 15, wherein engagement assembly includes an engagement member that engages more than one of the plurality of apertures.

17. The fifth wheel hitch support assembly of claim 12, wherein the adjustment member includes a threaded member that abuts the at least one support member when the engagement assembly is in the engaged position.

18. The fifth wheel hitch support assembly of claim 12 further including:
at least one spacer member abutting a downwardly exposed surface of the at least one mounting member and adapted to space the at least one mounting member from the vehicle frame rail to form the gap.

19. The fifth wheel hitch support assembly of claim 12, wherein the at least one mounting member includes an integral stop portion adapted to abut the at least one support bracket, thereby limiting the sliding movement of the at least one support bracket with respect to the at least one mounting member.

20. The fifth wheel hitch support assembly of claim 12, further including:
a sensor assembly adapted to sense the position and completeness of the engagement assembly with respect to the plurality of irregularities and provide a signal communicating the position and complete engagement; and
a controller adapted to receive the signal from the sensor and provide information to an operator based on the position of the engagement assembly with respect to the plurality of irregularities.

21. The fifth wheel hitch support assembly of claim 12, wherein the engagement assembly includes stroke depth adjustment assembly that limits a distance from the disengaged position to the engaged position the engagement assembly may travel.

22. The fifth wheel hitch support assembly of claim 12, wherein the plurality of irregularities are not equally spaced along the length of the at least one mounting member.

23. The fifth wheel hitch support assembly of claim 12, wherein the irregularities are located with regards to the at least one mounting member to provide a Ride-height within the range of from about 6 inches to about 12 inches.

24. The fifth wheel hitch support assembly of claim 23, wherein the irregularities are located with regards to the at least one mounting member to provide a Ride-height within the range of from about 7 inches to about 10 inches.

25. A fifth wheel hitch support assembly, comprising:
at least one support bracket adapted to pivotably support a fifth wheel hitch plate;
at least one L-shaped mounting member that includes a horizontally extending leg portion and a vertically extending leg portion adapted to be coupled to a vehicle frame rail to create a gap between the horizontal leg portion and the frame rail above the frame rail, wherein the gap extends longitudinally along the at least one mounting member, and wherein the at least one mounting member includes a plurality of irregularities extending through the vertical leg portion and spaced longitudinally along a length of the mounting member;
at least one guide plate releasably attached to an outboard surface and slidably abutting an outboard surface of the at least one mounting member; and
an engagement assembly operably coupled to the at least one support bracket, wherein a portion of the engagement assembly is slidable within the gap and is operable between an engaged position, wherein the engagement assembly engages at least one of the irregularities, thereby locking the at least one support bracket with respect to the at least one mounting member at a select position along the length of the at least one mounting member, and a disengaged position, wherein the engagement assembly does not engage the plurality of irregularities, thereby allowing the at least one support bracket to be slidably repositioned with respect to the at least one mounting member.

26. The fifth wheel hitch support assembly of claim 25, further comprising:
at least one spacer member positioned between the outboard surface of the at least one support member and the at least one guide plate, thereby spacing the at least one support member from the at least one guide plate.

27. The fifth wheel hitch support assembly of claim 25, further including:
at least one spacer member abutting a downwardly exposed surface horizontal leg portion of the at least one mounting member and adapted to space the at least one mounting member from the vehicle frame rail to form the gap.

28. The fifth wheel hitch support assembly of claim 25, further including:
a sensor assembly adapted to sense the position and engagement of the engagement assembly with respect to the plurality of irregularities and provide a signal communicating the position and complete engagement; and
a controller adapted to receive the signal from the sensor and provide information to an operator based on the position of the engagement assembly with respect to the plurality of irregularities.

29. The fifth wheel hitch support assembly of claim 25, wherein the engagement assembly includes stroke depth adjustment assembly that includes an adjustment member that may be selectively positioned to selectively adjust the distance from the disengaged position to the engaged position the engagement assembly may travel, and wherein the adjustment member includes a threaded member that abuts the at least one support member when the engagement assembly is in the engaged position.

30. The fifth wheel hitch support assembly of claim 25, wherein the plurality of apertures are not equally spaced along the length of the at least one mounting member.

31. The fifth wheel hitch support assembly of claim 25, wherein the irregularities are located with regards to the at least one mounting member to provide a Ride-height within the range of from about 6 inches to about 12 inches.

32. The fifth wheel hitch support assembly of claim 31, wherein the irregularities are located with regards to the at least one mounting member to provide a Ride-height within the range of from about 7 inches to about 10 inches.

* * * * *